United States Patent [19]
Britton et al.

[11] 4,182,188
[45] Jan. 8, 1980

[54] AIRSTREAM PRESSURE SENSING PROBES

[75] Inventors: John W. Britton; John N. Cannell, both of Bedford, England

[73] Assignee: Her Majesty the Queen in right of Great Britain, as represented by the Minister of National Defence, London, England

[21] Appl. No.: 917,728

[22] Filed: Jun. 21, 1978

[30] Foreign Application Priority Data

Jun. 24, 1977 [GB] United Kingdom ............... 26700/77

[51] Int. Cl.² ............................................. G01L 9/06
[52] U.S. Cl. ........................................ 73/721; 73/180; 73/708
[58] Field of Search ................. 73/180, 147, 726, 727, 73/720, 721

[56] References Cited

U.S. PATENT DOCUMENTS

| | | | |
|---|---|---|---|
| 2,509,421 | 5/1950 | Carter | 73/147 |
| 2,871,698 | 2/1959 | Bagby | 73/147 |
| 3,178,939 | 4/1965 | Rochester et al. | 73/180 |
| 3,498,142 | 3/1970 | Yasunami | 73/727 |

Primary Examiner—Donald O. Woodiel
Attorney, Agent, or Firm—Cushman, Darby & Cushman

[57] ABSTRACT

A probe includes a dome shaped body and at least four diaphragm pressure transducers mounted in the body with the diaphragms substantially flush with the domed surface of the body, wherein one of the transducers is mounted in the apex of the domed surface and the other transducers are spaced around the domed surface equidistant from the apex mounted transducer.

Preferably the dome carries five pressure transducers, four of which are equally spaced around the cone surface.

8 Claims, 3 Drawing Figures

4,182,188

AIRSTREAM PRESSURE SENSING PROBES

The present invention relates to probes for sensing dynamic and static pressure and measuring flow angles in an airstream from which other pressure dependent variables, such as Mach number, can be derived. The invention particularly, though not exclusively, relates to aircraft mounted probes for measuring high frequency pressure fluctuations.

A known pitot-static instrument for the measurement of flow angles includes an elongate cylindrical probe which projects forwardly from an aircraft on which it is mounted. The probe has a hemispherical head which has a central orifice and four symmetrically arranged orifices on the dome periphery equidistant from the central orifice. The orifices are individually connected by tubes which extend through the probe to differential pressure transducers carried in the aircraft. By connecting the pressure outputs from the selected orifices across the transducers, airstream flow angles relative to the aircraft which indicate, for example, aircraft sideslip or angle of attack, can be measured.

A disadvantage inherent in such probes is that rapid changes in flow angles and pressure, such as may be encountered at high aircraft speeds and in turbulent airstreams, cannot be accurately measured.

According to the invention an airstream pressure sensing probe includes a dome shaped body and at least four diaphragm pressure transducers mounted in the body with the diaphragms thereof substantially flush with the domed surface of the body, wherein one of the transducers is mounted in the apex of the domed surface and the other transducers are spaced around the domed surface equidistant from the apex-mounted transducer.

Preferably the probe has five transducers of which four are equally spaced around the dome surface.

In a preferred embodiment, the dome shaped body has a truncated cone configuration.

Preferably the pressure transducers are differential pressure transducers of which the diaphragms are exposed to a steady source of pressure within the body.

An embodiment of the invention will now be described with reference to the accompanying drawings of which:

Figure 1:
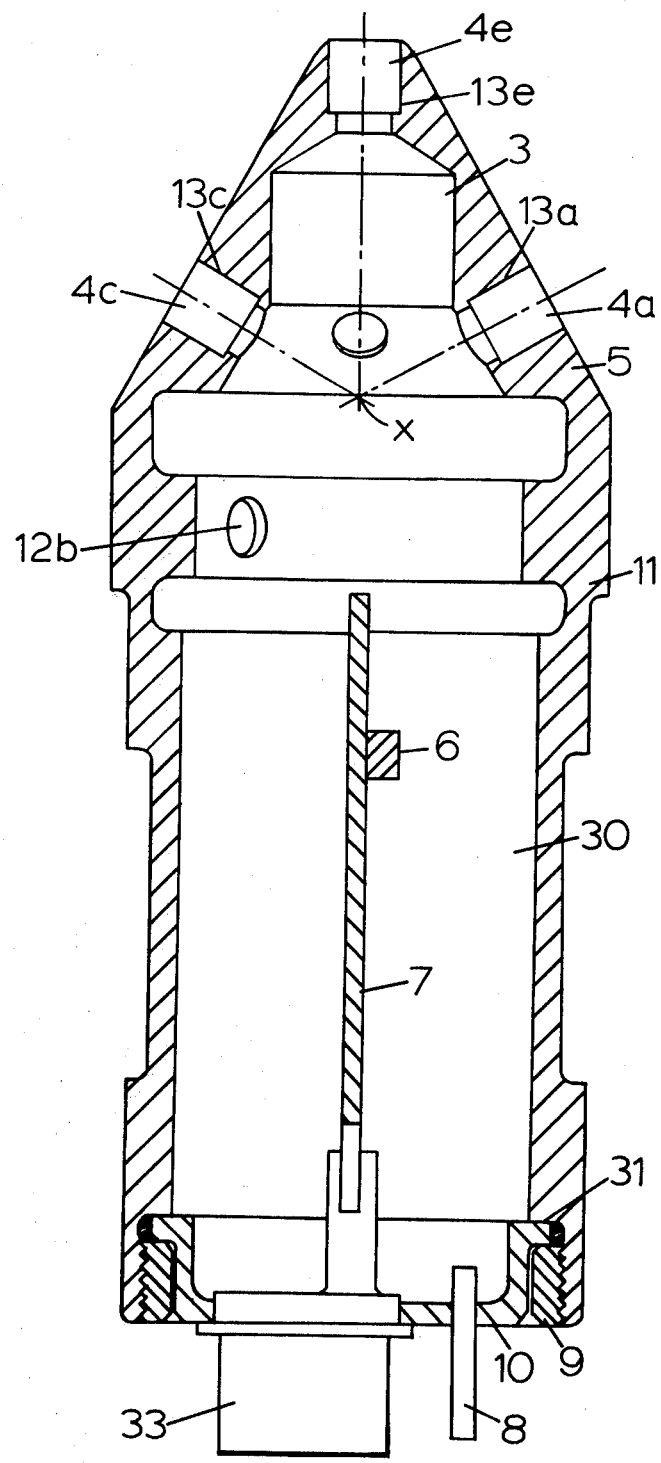
FIG. 1 is a part sectional side elevation of a probe in accordance with the invention.

Referring to FIG. 1 of the drawings, the probe includes a nose portion 5 having a hollow, truncated cone configuration, of 60° cone angle, and a tubular housing 11 which extends rearwardly from the base of the nose portion 5. The housing 11 is clamped at its rear end to an aircraft mounted boom (not shown). The nose portion 5 carries five identical diaphragm differential pressure transducers, 4a to 4e, one of which is shown in section in FIG. 3. One of the transducers, 4e, is carried in a cylindrical bore 3e which is coaxial with the cone of the nose portion 5, and the other four transducers, 4a to 4d, are mounted in cylindrical bores, 13a to 13d, respectively, which are spaced at 90° intervals around the axis of the nose portion 5, the longitudinal axes of the bores 13a to 13d intersecting the axis of the cone of the nose portion 5 at a common point X so that the transducers 4a to 4d are equidistant from the transducer 4e. The nose portion 5 has a cavity 3 which communicates via short passages with the five transducers 4a to 4d and with the interior 30 of the housing 11. The rear end of the housing 11 has a closure plate 10 which is held in sealing contact with an annular shoulder 31 of the housing by means of an externally threaded retaining ring 9 which engages an internally threaded portion of the housing 11. A pipe 8 extends through the plate 10 and supplies the interior of the housing with dry, filtered air which is fed to the pipe via a 60 m length of 1 mm bore tubing to ensure a steady supply pressure. The absolute pressure of the air in the housing interior is measured by a transducer 6 mounted on a circuit board 7 which is carried in axially extending slots in the housing 11.

Figure 2:
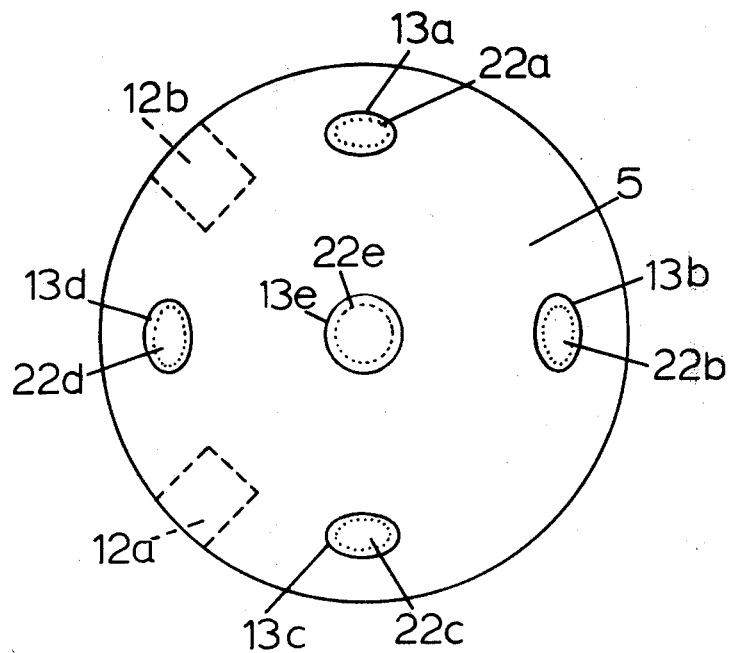
FIG. 2 is a front view of the probe shown in FIG. 1.

A pair of resistance thermometers 12a, 12b (indicated by the dotted lines in FIG. 2) measure ambient temperature and are mounted in the housing 11 near the pressure transducers 4.

Figure 3:
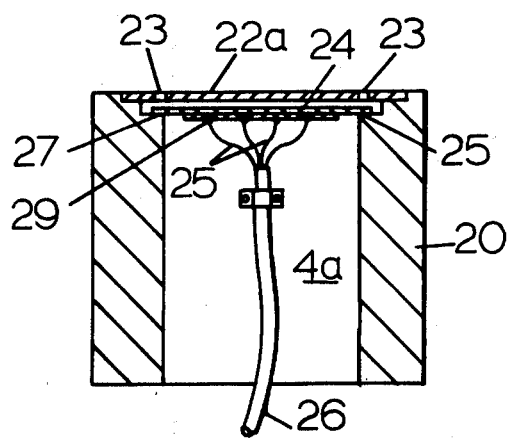
FIG. 3 is a sectional side elevation of a diaphragm pressure transducer of the probe of FIGS. 1 and 2, drawn on a larger scale.

FIG. 3 shows one of the differential pressure transducers, 4a, in section. The transducer includes a silicon diaphragm, 24, 0.04 mm thick, of which the periphery is adhesively mounted onto an annular shoulder 27 of a rigid tube 20. Variations in electrical resistance of an element bonded onto the diaphragm are measured by a Wheatstone bridge circuit 20 which is diffusion bonded onto the underside of the diaphragm 24. Fine wires 25 carry the output from the bridge circuit 29 to a cable 26 which is clamped to interior surface of tube 20. A protective screen 22a, which is perforated by a series of holes 23 arranged in a circular pattern, is mounted at the top of the tube 20 and spaced from the diaphragm. The screen protects the diaphragm from the direct impact of particles on unsupported areas of the diaphragm. The transducer has a maximum output of ±50 mV and operates over a range of 0 to ±5 psi differential pressure, and has low hysteresis, low acceleration sensitivity, and a very high natural frequency of approximately 60 KHz.

The transducers 4 and 6 are sensitive to temperature variations which affect both the zero and span calibrations of the transducers. The bridge circuit of each pressure transducer is temperature compensated in respect to zero calibration, and temperature compensation for span calibration is achieved by applying the output from the temperature transducer 12b to the bridge circuits of the pressure transducers in a conventional manner. The temperature transducer 12a monitors ambient temperature variations, and the output is continuously recorded.

The circuit board 7 carries zero compensation resistors, and the span compensation circuit. The board is also a junction board for the wiring from the transducers 4 and 12 and an output socket 33.

In operation, the pressure transducers 4 sense the pressure at their locations on the surface of the nose portion 5. The transducers 4a and 4c are located in the angle of attack plane and the difference between their outputs, P4a–P4c, varies primarily with the incidence of the nose, and hence the aircraft carrying the probe, with reference to the airflow over the nose. Similarly, transducers 4b and 4d are employed to measure flow angles in the yaw plane of the aircraft.

Transducers 4a to 4d are employed in association with transducer 4e to measure variations in Mach number, airspeed, ambient static pressure and ambient total pressure.

We claim:

1. An airstream pressure sensing probe comprising a domed body and at least four diaphragm pressure transducers mounted in the body with the diaphragms thereof substantially flush with the domed surface and wherein one of the transducers is mounted in the apex of the domed surface and the other transducers are spaced around the domed surface equidistant from the apex-mounted transducer.

2. An airstream pressure sensing probe according to claim 1 comprising five diaphragm pressure transducers of which four are equally spaced around the domed surface.

3. An airstream pressure sensing probe according to claim 1 or claim 2 in which the dome shaped body has a truncated cone configuration.

4. An airstream pressure sensing probe according to claim 1, claim 2 or claim 3 in which the pressure transducers are differential pressure transducers and the internal face of each diaphragm is subjected to a steady source of pressure.

5. An airstream pressure sensing probe according to claim 4 in which the internal faces of the diaphragms are connected to a chamber within the body and the chamber is supplied with air or gas at a steady supply pressure.

6. An airstream pressure sensing probe according to claim 4 in which the pressure transducers comprise elements bonded to the diaphragms thereof and connected to transmit variations in electrical resistance of the elements to recording means.

7. An airstream pressure sensing probe according to claim 6 in which variations in electrical resistance of the elements are measured by a Wheatstone bridge circuit.

8. An airstream pressure sensing probe according to claim 7 further comprising a transducer arranged to measure ambient temperature and connected to apply its output to the bridge circuit for temperature compensation.

* * * * *